(12) United States Patent
Obata et al.

(10) Patent No.: US 7,861,522 B2
(45) Date of Patent: Jan. 4, 2011

(54) ELECTRICALLY DRIVEN BRAKE BOOSTER

(75) Inventors: Takuya Obata, Minami-ALPS (JP);
Toshio Takayama, Kai (JP); Takayuki Ohno, Minami-ALPS (JP); Yukio Ohtani, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 12/153,990

(22) Filed: May 28, 2008

(65) Prior Publication Data

US 2008/0295512 A1     Dec. 4, 2008

(30) Foreign Application Priority Data

May 31, 2007    (JP) .............................. 2007-146029

(51) Int. Cl.
  *F16D 31/02*    (2006.01)
(52) U.S. Cl. ........................................................ 60/545
(58) Field of Classification Search .................... 60/535, 60/545
  See application file for complete search history.

(56) References Cited

U.S. PATENT DOCUMENTS

| 4,812,723 | A | * | 3/1989 | Shimizu ..................... 60/545 |
| 4,918,921 | A | * | 4/1990 | Leigh-Monstevens et al. . 60/545 |
| 5,016,442 | A | * | 5/1991 | Zander et al. ................. 60/535 |
| 5,046,313 | A | * | 9/1991 | Crumb et al. ................. 60/535 |
| 6,574,959 | B2 | * | 6/2003 | Fulks et al. ................... 60/545 |
| 6,634,724 | B2 | * | 10/2003 | Kobayashi et al. ............ 60/545 |
| 6,758,041 | B2 | * | 7/2004 | Bishop et al. ................. 60/545 |
| 7,367,187 | B2 | * | 5/2008 | Ikeda et al. ................... 60/545 |

FOREIGN PATENT DOCUMENTS

| EP | 0 852 297 | 7/1998 |
| GB | 2 279 125 | 12/1994 |
| JP | 10-138909 | 5/1998 |

OTHER PUBLICATIONS

European Search Report (in English language) issued Sep. 23, 2008.

\* cited by examiner

*Primary Examiner*—Michael Leslie
(74) *Attorney, Agent, or Firm*—Wenderoth, Lind & Ponack, L.L.P.

(57) ABSTRACT

The present invention relates to an electrically driven brake booster in which boost control is performed as follows; when an input piston is displaced forward by an input rod upon an operation of a brake pedal, an electric motor is operated according to the input, and a primary piston is displaced forward by a ball-screw mechanism, and then a primary and secondary pressure chamber in a master cylinder main body are pressurized. A first seal and a second seal are disposed at a seal portion between the primary piston and the input piston. A portion between the first seal and the second seal is in communication with an outside through a discharge passage. Brake fluid which leaks from the first seal is sealed off by the second seal, and is discharged to the outside through the discharge passage, whereby it becomes possible to prevent that the electric motor and the ball-screw mechanism otherwise might be corroded by the leaking brake fluid.

20 Claims, 6 Drawing Sheets

ELECTRICALLY DRIVEN BRAKE BOOSTER

BACKGROUND OF THE INVENTION

The present invention relates to an electrically driven brake booster attached to a hydraulic brake apparatus of a vehicle such as an automobile for performing boost control with use of an electric motor.

As a conventional and known electrically driven brake booster, for example, Japanese Patent Application Public Disclosure H10-138909 discloses an electrically driven brake booster attached to a hydraulic brake apparatus of an automobile. This brake booster performs boost control of a hydraulic pressure generated in a master cylinder by actuating an electric motor to provide a servo force in response to an input such as a braking operation carried out by a driver.

The electrically driven brake booster disclosed in Japanese Patent Application Public Disclosure H10-138909 comprises: an input piston coupled to a brake pedal (having a small pressure-receiving area); a cylindrical booster piston (having a large pressure-receiving area) fittingly containing the input piston therein, and fittingly contained by the master cylinder therearound; an electric motor coupled to the booster piston through a ball-screw mechanism (rotation-linear motion converting mechanism); various sensors for detecting control parameters such as an input to the brake pedal and an output of the master cylinder; and a controller for controlling operation of the electric motor based on detection results from the sensors. This brake booster actuates the electric motor in response to, for example, operation of a brake pedal by a driver, provides a thrust force (servo force) to the booster piston, and increases a pressure in the master cylinder. A part of the increased hydraulic pressure in the master cylinder is fed back to the brake pedal via the input piston.

In the electrically driven brake booster disclosed in Japanese Patent Application Public Disclosure H10-138909, the electric motor and the ball-screw mechanism are disposed on the outer surface of the master cylinder, as a result of which the electrically driven brake booster can be made smaller and space saved.

However, in the electrically driven brake booster disclosed in Japanese Patent Application Public Disclosure H10-138909, a drawback exists, as follows: generally, brake fluid is corrosive to lubricants, synthetic resins and the like. Therefore, if a seal between the booster piston and the input piston is passed through, brake fluid leaking from the master cylinder may flow into the ball-screw mechanism, causing a deterioration in the lubricant therein and reducing its lubricity, and/or may enter the electric motor, causing damage to a coating of a coil of the motor.

SUMMARY OF THE INVENTION

The present invention has been contrived in view of the foregoing, and an object thereof is to provide an electrically driven brake booster capable of preventing corrosion that may be caused by leakage of a brake fluid. An aspect of the present invention is an electrically driven brake booster, comprising:

a cylindrical booster piston adapted to pressurize a pressure chamber in a master cylinder;

an input piston slidably and liquid-tightly inserted through the booster piston with a seal portion sandwiched between the input piston and the booster piston, the input piston adapted to pressurize the pressure chamber in the master cylinder in response to an operation of a brake pedal;

an electric motor; and a rotation-linear motion converting mechanism adapted to convert a rotation of the electric motor into a linear motion to provide a thrust force to the booster piston, wherein the thrust force provided to the booster piston is adjusted by controlling an operation of the electric motor according to an input to the input piston; and the electrically driven brake booster further comprises a discharge passage for discharging a brake fluid which leaks from the seal portion between the booster piton and the input piston so that the leaking brake fluid is prevented from entering portion(s) susceptible to corrosion by the brake fluid.

Another aspect of the present invention is an electrically driven brake booster, comprising:

a cylindrical booster piston adapted to pressurize a pressure chamber in a master cylinder;

an input piston slidably and liquid-tightly inserted through the booster piston with a seal portion sandwiched between the input piston and the booster piston, the input piston adapted to pressurize the pressure chamber in the master cylinder in response to an operation of a brake pedal;

an electric motor; and a rotation-linear motion converting mechanism adapted to convert a rotation of the electric motor into a linear motion to provide a thrust force to the booster piston, wherein the thrust force provided to the booster piston is adjusted by controlling an operation of the electric motor according to an input to the input piston; and the booster piston includes a retaining unit for retaining a brake fluid which leaks from the seal portion between the booster piston and the input piston so that the leaking brake fluid is prevented from entering portion(s) susceptible to corrosion by the brake fluid.

DETAILED DESCRIPTION OF THE PREFERRED EMBODIMENTS

Hereinafter, embodiments of the present invention will be described in detail with reference to the drawings.

Figure 1:
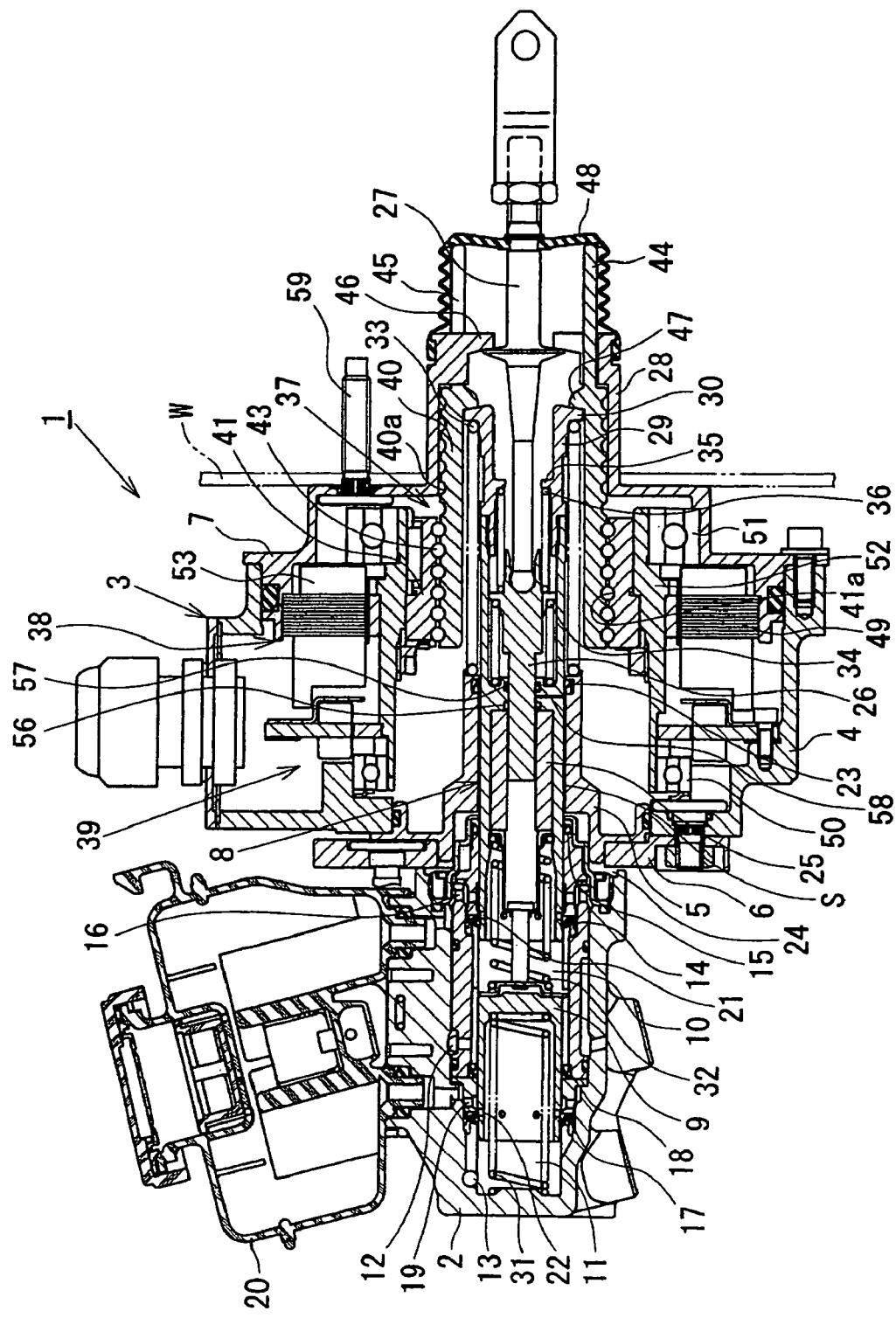
FIG. 1 is a vertical cross-sectional view illustrating an electrically driven brake booster of a first embodiment of the present invention.
Figure 2:
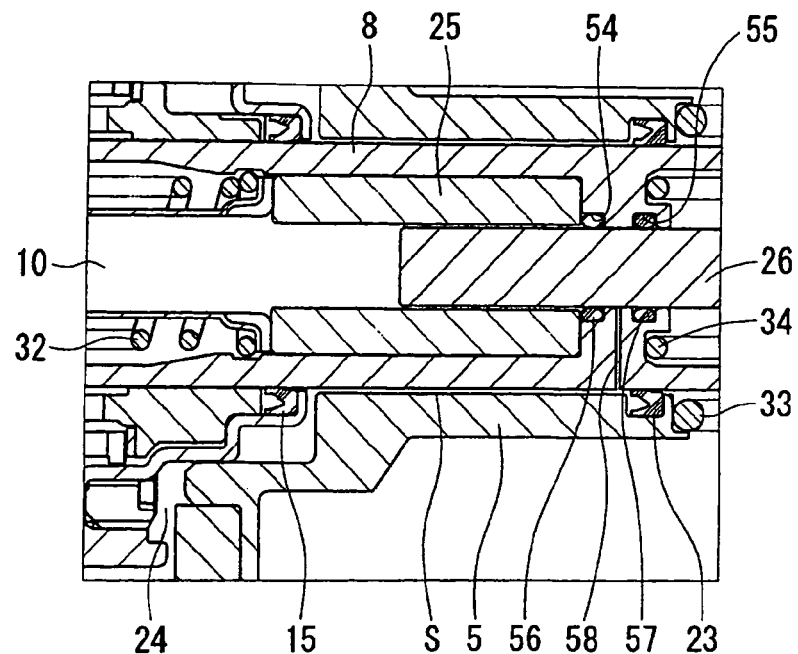
FIG. 2 is an enlarged vertical cross-sectional view illustrating main portions of the electrically driven brake booster of FIG. 1.

Referring to FIGS. 1 and 2, a first embodiment of the present invention will now be described. As shown in FIGS. 1 and 2, an electrically driven brake booster 1 of the first embodiment is configured to be used with a tandem master cylinder. The electrically driven brake booster 1 comprises a housing 3 adapted to be coupled to an open end of a master cylinder main body 2 (master cylinder) which is formed to have a substantially cylindrical bottomed shape. The housing 3 comprises a housing main body 4, a guide member 5 (guide portion), a front cover 6, and a rear cover 7. The housing main body 4 is formed in a substantially cylindrical bottomed shape and has an opening at a bottom thereof. The guide member 5 (guide portion) is formed in a substantially cylindrical shape, and is coupled to the open end of the master cylinder main body 2. The guide member 5 is attached to the opening at the bottom of the housing main body 4 by the front cover 6. The rear cover 7 is attached to the open end of the housing main body 4.

The master cylinder main body 2 is coupled with the guide member 5 of the housing 3, and defines a cylinder bore therein. In this cylinder bore, tandemly-arranged primary piston 8 (booster piston) and secondary piston 9 are slidably fitted. The primary piston 8 is formed to have a substantially cylindrical bottomed shape. A primary pressure chamber 10 (pressure chamber) is defined between the primary piston 8 and the secondary piston 9. A secondary pressure chamber 11 (pressure chamber) is defined between the secondary piston 9 and a bottom of the master cylinder main body 2. A primary port 12 communicable with the primary pressure chamber 10, and a secondary port 13 communicable with the secondary pressure chamber 11 are formed through a side wall of the master cylinder main body 2. The primary and secondary ports 12 and 13 are respectively connected to associated wheel cylinders (not shown) for actuating brake systems mounted on wheels.

A pair of piston seals 14 and 15 are disposed in an axially spaced-apart relationship for providing a seal between the cylinder bore of the master cylinder main body 2 and the primary piston 8. A primary relief port 16 is formed between these piston seals 14 and 15. Similarly to the primary piston 8, a pair of piston seals 17 and 18 are disposed in an axially spaced-apart relationship to provide a seal between the cylinder bore of the master cylinder main body 2 and the second piston 9. A secondary relief port 19 is formed between the piston seals 17 and 18. A reservoir 20 for reserving brake fluid is connected to the primary and secondary relief ports 16 and 19. When the primary piston 8 is in its original position (non-braking position), the primary pressure chamber 10 is connected to the reservoir 20 through a piston port 21 formed through the side wall of the primary piston 8, and the primary relief port 16. When the primary piston 8 moves forward, connection between the primary relief port 16 and the piston port 21 is cut off by the side wall of the primary piston 8, and a pressure in the primary pressure chamber 10 is increased. Similarly, when the secondary piston 9 is in its original position (non-braking position), the secondary pressure chamber 11 is connected to the reservoir 20 through a piston port 22 formed through the side wall of the secondary piston 9, and the secondary relief port 19. When the secondary piston 9 moves forward, connection between the secondary relief port 19 and the piston port 22 is cut off by the side wall of the secondary piston 9, and a pressure in the secondary pressure chamber 11 is increased.

A seal member 23 (seal unit) is disposed at the guide member 5 in an axially spaced-apart relationship with another seal member, the piston seal 15 (seal unit) for providing a seal between the primary piston 8 and the guide member 5. A space S between the piston seal 15 and the seal member 23 is open to an outside on a front side of the front cover 6 through a discharge passage 24 formed between the master cylinder main body 2 and the guide member 5.

A guide member 25 is fitted in the primary piston 8, extending from a bottom portion to an inner portion of the primary piston 8. An input piston 26 is slidably and liquid-tightly inserted through the guide member 25. The input piston 26 has an appropriately small diameter so that a pressure-receiving area respective to the primary pressure chamber 10 is sufficiently smaller than a pressure-receiving area of the primary piston 8. A front end of an input rod 27 is coupled to a rear end of the input piston 26 which extends beyond the primary piston 8. A proximal end side of the input rod 27 is inserted through a cylindrical case portion 28 formed at the rear cover 7 to extend to an outside. A brake pedal (not shown) can be coupled to the proximal end of the input rod 27.

A cylindrical extension member 29 is coupled to a rear end of the primary piston 8. The extension member 29 extends into an inside of the case portion 28 of the rear cover 7. An outer flange 30 is formed at a rear end of the extension member 29. The secondary piston 9 is urged by a return spring 31 disposed between the secondary piston 9 and the bottom of the master cylinder main body 2. The primary piston 8 is urged to its original position by a return spring 32 disposed between the primary piston 8 and the secondary piston 9, and by a return spring 33 disposed between a rear end of the guide member 5 and the outer flange portion 30 of the extension member 29. The input piston 26 is resiliently maintained in its axial position relative to the primary piston 8 by a spring 34 disposed between the input piston 26 and the bottom of the primary piston 8, and by a spring 36 disposed between the input piston 26 and a spring bearing 35 of the extension member 29.

In the housing 3, a ball-screw mechanism 37 (rotation-liner motion converting mechanism), an electric motor 38, and a resolver 39 are disposed. The ball-screw mechanism 37 comprises a cylindrical linear motion member 40, rotation member 41, and a plurality of balls 43. The rear portion of the primary piston 8 and the extension member 29 are inserted in the linear motion member 40. The rotation member 41 is disposed on the outer surface of the linear motion member 40. The plurality of balls 43 are disposed in spiral ball grooves 40a and 41a formed between the linear motion member 40 and the rotation member 41. The linear motion member 40 is inserted in the case portion 28 of the rear cover 7, and is guided so as to be movable in the axial direction. Grease is applied as a lubricant agent on the ball grooves 40a and 41a, and the balls 43. The linear motion member 40 includes an extension portion 44 on a rear end side thereof. The extension portion 44 extends beyond the case portion 28 of the rear cover 7 to an outside. The extension portion 44 includes an axially extending slit 45 formed therein. A pawl portion 46 is formed at an end of the case portion 28. Fixing the pawl portion 46 into the slit 45 enables axial movement of the linear motion member 40 relative to the housing 3, and at the same time, restricts rotation of the linear motion member 40. An inner flange portion 47 is formed at an inner circumferential portion of the linear motion member 40. The inner flange portion 47 abuts against the outer flange portion 30 of the extension member 29 coupled to the primary piston 8. The pawl portion 46 decides return positions of the linear motion member 40 and the input rod 27. A bellows dust cover 48 is attached between the case portion 28 of the rear cover 7 and the rear end of the input rod 27. The dust cover 48 seals off the housing 3 and prevents entry of foreign materials.

The electric motor 38 comprises a stator 53 fixed to the housing 3, and rotor 52 rotatably supported by bearings 50 and 51 in the housing 3. The rotor 52 is coupled to the rotation member 41 of the ball-screw mechanism 37. When a current is applied to a coil 49 of the stator 53, the rotor 52 rotates, causing the rotation member 41 of the ball-screw mechanism 37 to rotate, and thereby-caused rolling motion of the balls 43 in the ball grooves causes the linear motion member 40 to linearly move in the axial direction. At this time, rotational displacement (position) of the electric motor 38 is detected by the resolver 39. In addition, when the linear motion member 40 moves forward, the primary piston 8 also moves forward since the inner flange 47 of the linear motion member 40 pushes the outer flange 30 of the extension member 29.

Referring FIG. 2, a seal structure between the primary piston 8 and the input piston 26 will be described below. Two inner circumferential grooves 54 and 55 are formed in an axially spaced-apart relationship, at the opening of the bottom of the primary piston 8 through which the input piston 26 is inserted. An end surface of the guide member 25 fitted in the primary piston 8 forms an end face of the groove 54 or one of the inner circumferential grooves. A first seal 56 and a second seal 57 (O-rings) are respectively fitted in the inner circumferential grooves 54 and 55 to provide a seal between the primary piston 8 and the input piston 26. A discharge passage 58 is provided at the bottom of the primary piston 8 such that the passage 58 enables communication between a portion between the inner circumferential groove 54 (first seal 56) and the inner circumferential groove 55 (second seal 57), and the space S between the piston seal 15 and the seal member 23.

The electrically driven brake booster 1 is attached to an engine room side of a dash panel W, which serves as a partition wall dividing the engine room and a vehicle compartment of a vehicle, by a stud bolt 59 erected from the rear cover 7 of the housing 3. The case portion 28 of the rear cover 7 is inserted through an opening of the dash panel W to extend to the vehicle compartment side, and a brake pedal (not shown) is coupled to the input rod 27. Various sensors (not shown), such as a displacement sensor for detecting a displacement of the input rod 27, a pressure sensor for detecting pressures of the primary and secondary pressure chambers 10 and 11, and the like are disposed. Also, a controller (not shown) is disposed for controlling rotation of the electric motor 38 based on the detection results of the sensors and the resolver 39.

The first embodiment configured as described above works as follows. When the input piston 26 moves forward in response to an operation of the brake pedal (input rod 7), the electric motor starts to rotate by receiving a controlling current from the controller. This rotation of the electric motor is transmitted to the ball-screw mechanism 37, therefore causing the primary piston 8 to move forward along with the input piston 26. By these displacements of pistons, pressures in the primary and secondary pressure chambers 10 and 11 are increased. In this way, boost control is carried out by providing a servo force with use of the electric motor 38 according to an operation of the brake pedal. At this time, the pressure in the primary pressure chamber 10 is fed back to the input rod 27 (brake pedal) through the input piston 26 (having a small pressure-receiving area). In addition, rotation of the electric motor 38 can be appropriately controlled by the controller based on the detection results of the sensors, so that it becomes possible to utilize advanced brake control such as brake assist control, regenerative control, vehicle following control, and so on.

If brake fluid leaks from the first seal 56 provided between the primary piston 8 and the input piston 26, the fluid leaking from the first seal 56 is prevented from flowing toward the back side of the primary piston 8 due to presence of the second seal 57. Instead, the leaking fluid flows through the discharge passage 58, the space S between the piston seal 15 and the seal member 23, and the discharge passage 24, and then is discharged into the engine room located in front of the front cover 6. By this arrangement, it becomes possible to prevent entry of corrosive brake fluid into the ball-screw mechanism 37 and the electric motor 38 at the back of the primary piston 8, and is therefore possible to improve reliability of the electrically driven brake booster.

Figure 3:
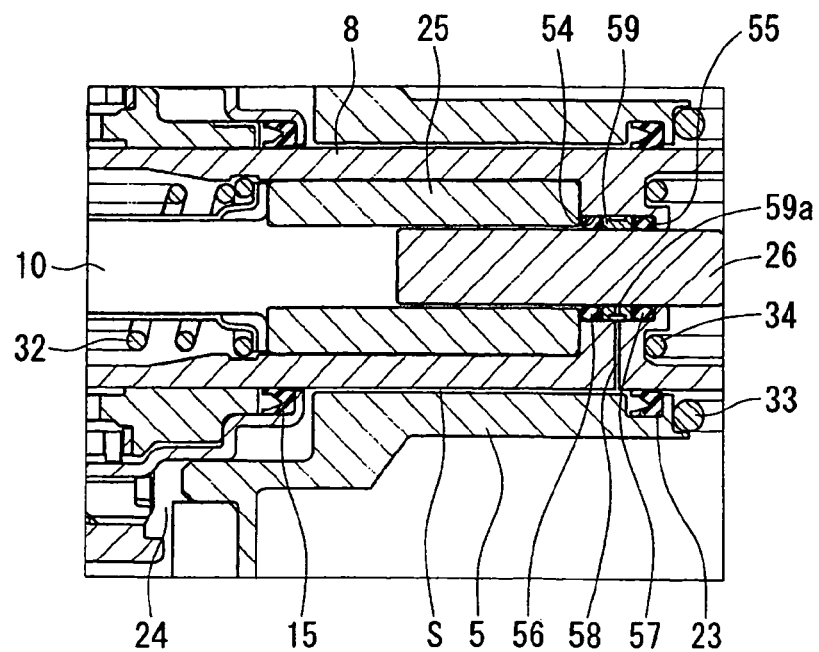
FIG. 3 is an enlarged vertical cross-sectional view illustrating main portions of a first modification of the electrically driven brake booster of FIG. 1.
Figure 4:
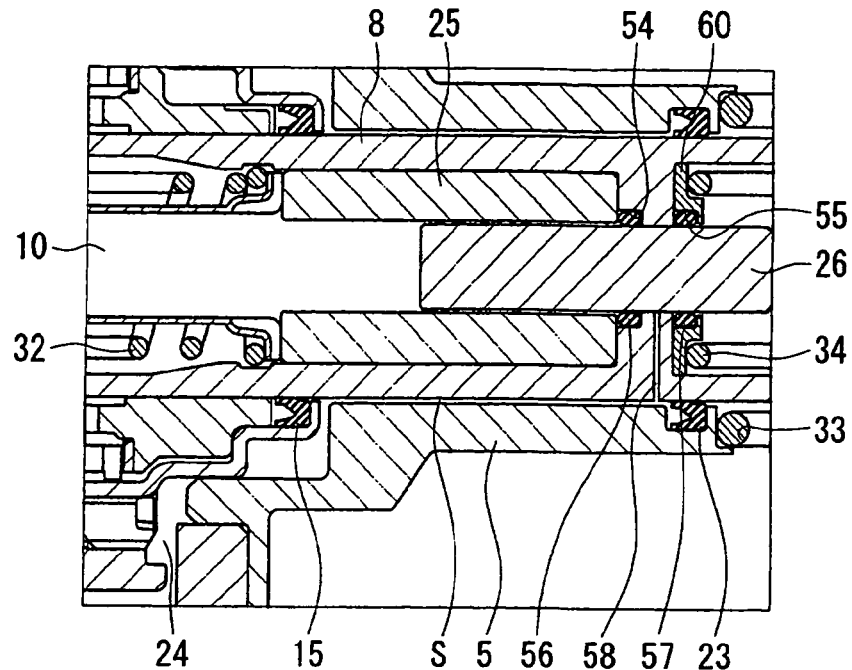
FIG. 4 is an enlarged vertical cross-sectional view illustrating main portions of a second modification of the electrically driven brake booster of FIG. 1.
Figure 5:
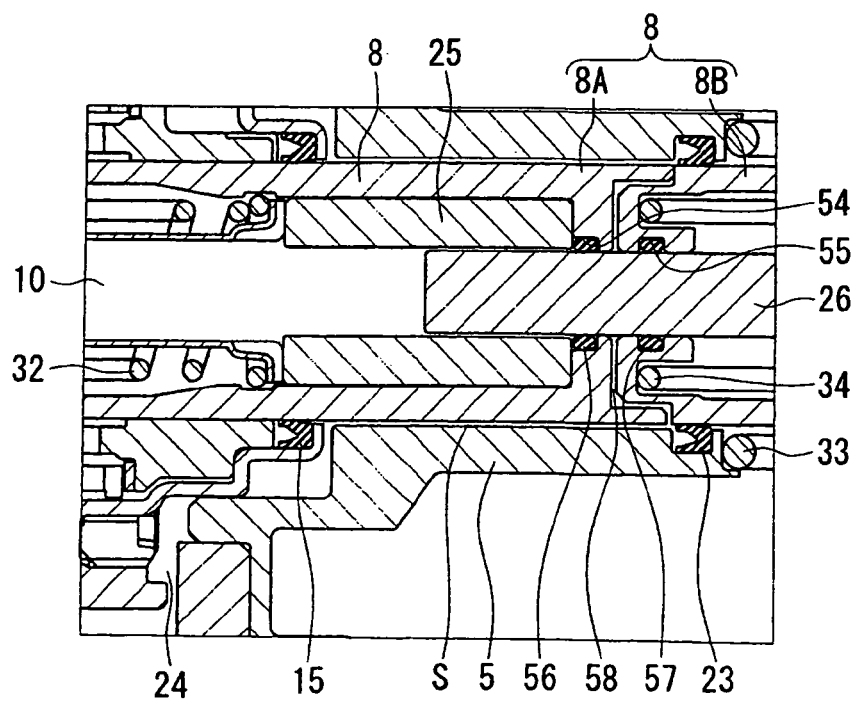
FIG. 5 is an enlarged vertical cross-sectional view illustrating main portions of a third modification of the electrically driven brake booster of FIG. 1.

Referring to FIGS. 3 to 5, modifications of the above-described first embodiment will be described below. Elements corresponding to the elements in the above-discussed first embodiment will be denoted by the same reference numerals as those used in the first embodiment, and detailed description will be made below only as to elements and features that are different from or absent in the first embodiment.

In the modification illustrated in FIG. 3, a groove is formed at a primary piston 8, and the groove is divided by an O-ring member 59 so as to form two inner circumferential grooves 54 and 55, in which first and second seals 56 and 57 are fitted; in other words, the two inner circumferential grooves 54 and 55 are formed by dividing the inner circumferential surface of the primary piston 8 with use of the ring member 59.

An advantage of this modification is that it becomes possible to facilitate a manufacturing process of the inner grooves 54 and 55, and an installing process of the first and second seals 56 and 57. The ring member 59 may include a plurality of radially extending holes 59*a*. The radially extending holes 59*a* can establish communication between an inner circumference and an outer circumferences of the ring member 59, thereby establishing communication between an outer circumferential surface of an input piston 26 and a discharge passage 24. It should be noted that a means for opening communication between the inner and outer circumferences of the ring member 59 is not limited to the plurality of radially extending holes. For example, a groove may be provided on a side of the ring member 59 for opening communication between inner and outer sides of the ring member 59.

FIG. 4 illustrates another modification. As shown in FIG. 4, a spring shoe 60 (abutting member) is interposed between a primary piston 8 and a spring 34. The spring shoe 60 is formed in a stepped ring shape, and abuts against a bottom of the primary piston 8. An inner circumferential groove 55, in which a second seal 57 is fitted, is defined by a groove portion formed on an inner circumferential surface of the spring shoe 60, and an end surface of the bottom of the primary piston 8. An advantage of this modification is that it facilitates a manufacturing process of the inner grooves 54 and 55, and also facilitates an installing process of the first and second seals 56 and 57.

It should be noted that, an inner circumferential groove may be formed at a guide member 25, and a first seal 56 may be fitted in this inner circumferential groove. It may be possible for a first seal 56 to be fitted in a guide member 25 and/or a second seal 57 to be fitted with use of a spring shoe 60.

FIG. 5 illustrates still another modification. As shown in FIG. 5, a primary piston 8 is axially divided at a bottom thereof into two pistons, a front primary piston 8A and a rear primary piston 8B. An inner circumferential groove 54 for a first seal 56 is formed at the front primary piston 8A, and an inner circumferential groove 55 for a second seal 57 is formed at the rear primary piston 8B. A discharge passage 58 is formed along the dividing surface between the front and rear primary pistons 8A and 8B. An advantage of this modification is that the discharge passage can be easily manufactured.

Figure 6:
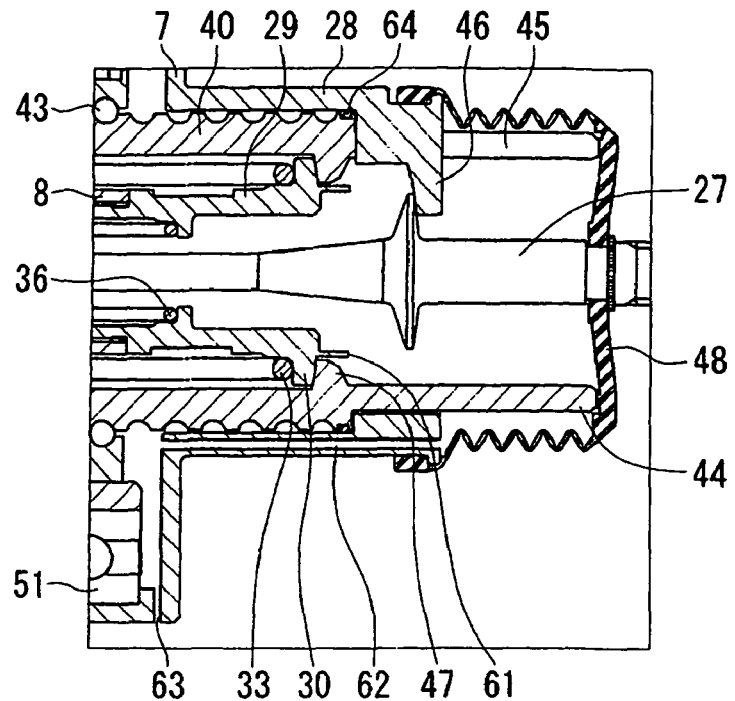
FIG. 6 is an enlarged vertical cross-sectional view illustrating main portions of an electrically driven brake booster of a second embodiment of the present invention.

Referring to FIG. 6, a second embodiment of the present invention will be described below. Elements corresponding to the elements in the above-discussed first embodiment will be denoted by the same reference numerals as those in the first embodiment, and detailed description will be made below only as to elements and features that are different from or absent in the first embodiment.

As shown in FIG. 6, in the second embodiment, a cylindrical extension portion 61 is formed at a rear end of an extension member 29 coupled to a back of a primary piston 8. The extension portion 61 is configured to be inserted on an inner side relative to an inner flange 47 of a linear motion member 40 of a ball-screw mechanism 37. A discharge passage 62 is formed so as to axially extend through a lower portion of a side wall of a case portion 28 of a rear cover 7. Further, a discharge passage 63 is formed at the lower portion of the side wall of the rear cover 7 so as to extend along an inner surface of a bottom attached to a dash panel W, and be open to an outside. A seal member 64 is disposed for providing a seal between a ball groove on a rear side of the linear motion member 40 and the case portion 28 of the rear cover 7.

One advantageous effect brought about by this structure is as follows; if brake fluid leaks from between a primary piston 8 and an input piston 26, this brake fluid flows through an inside of the primary piston 8 and the extension member 29, and then is discharged into a rear end of the linear motion member 40 via the extension portion 61. After that, the brake fluid flows through a slit 45 formed at the rear end of the linear motion member 40 into a rear side of the case portion 28. At this time, it is possible to prevent entry of the brake fluid into the inside of the ball-screw mechanism 37 due to provision of the extension portion 61 and the seal member 64. In addition, it is possible to prevent entry of the brake fluid into a vehicle compartment due to provision of a dust cover 48. Then, the brake fluid sent to the rear side of the case portion 28 is discharged from an end surface of the case portion 28 to an outside (engine room) through the discharge passages 62 and 63 formed on an outer circumferential side of the seal member 64. In this way, it becomes possible to prevent entry of corrosive brake fluid into the ball-screw mechanism 37, the electric motor 38 and the vehicle compartment, and is therefore possible to improve reliability of an electrically driven brake booster.

Figure 7:
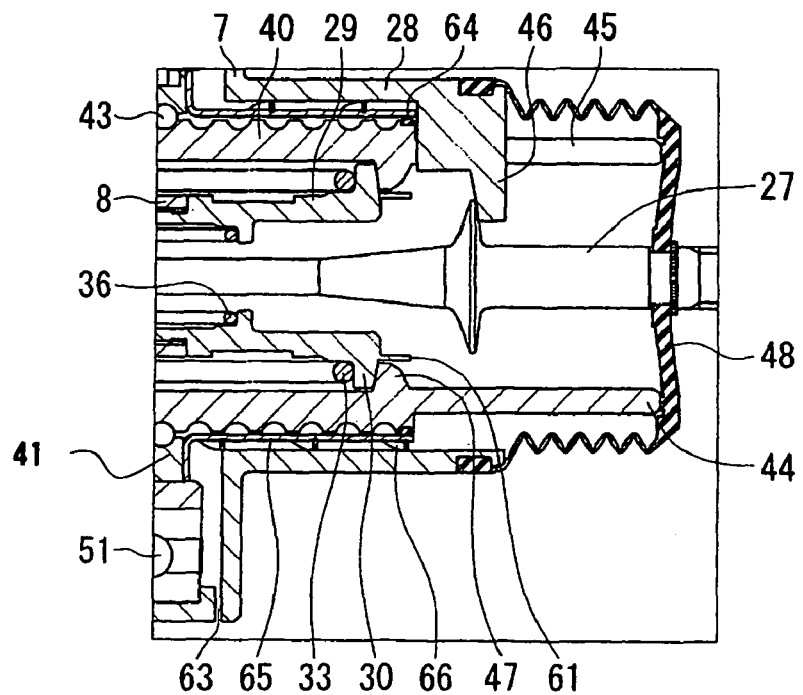
FIG. 7 is an enlarged vertical cross-sectional view illustrating main portions of a modification of the electrically driven brake booster of FIG. 6.
Figure 10:
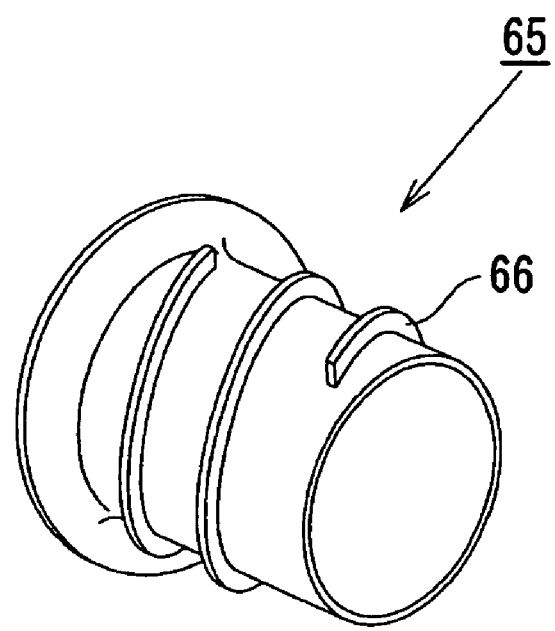
FIG. 10 is an enlarged perspective view illustrating a sleeve member in the electrically driven brake booster of FIG. 7.

Referring to FIGS. 7 and 10, modifications of the second embodiment of the present invention will be described below. Elements corresponding to the elements in the above-discussed second embodiment will be denoted by the same reference numerals as those in the second embodiment, and detailed description will be made below only as to elements and features that are different from or absent in the second embodiment.

In the modification illustrated in FIGS. 7 and 10, a cylindrical sleeve 65 is rotatably disposed between a case portion 28 and a linear motion member 40, instead of providing the discharge passage 62. A seal member 64 provides a seal between the sleeve 65 and the linear motion member 40. The sleeve 65 comprises a spiral lip member 66 formed in a protruding manner on an outer surface of the sleeve 65. A tip of the lip member 66 slidably contacts an inner surface of the case portion 28. The sleeve 65 has a flange portion at a proximal end thereof, which is coupled to an end of a rotation member 41. The sleeve 65 rotates together with the rotation member 41, and rakes brake fluid kept in a rear side of the case portion 28 by the lip member 66 to discharge it from a discharge passage 63. As a result, it becomes possible to prevent entry of corrosive brake fluid into a ball-screw mechanism 37, an electric motor 38 and a vehicle compartment, and is therefore possible to improve reliability of an electrically driven brake booster 1.

Figure 8:
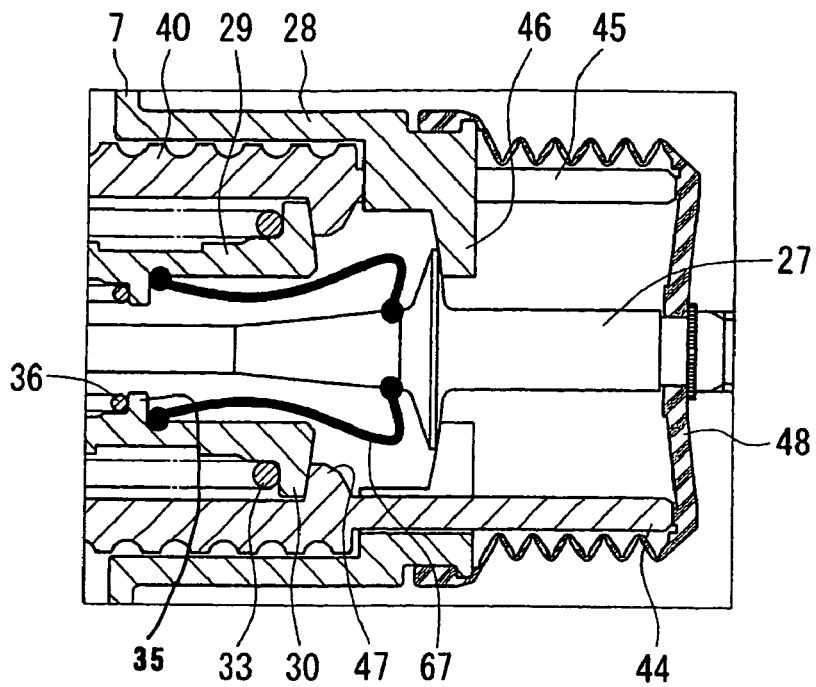
FIG. 8 is an enlarged vertical cross-sectional view illustrating main portions of an electrically driven brake booster of a third embodiment of the present invention.

Referring to FIG. 8, a third embodiment of the present invention will be described below. Elements corresponding to the elements in the above-discussed first embodiment will be denoted by the same reference numerals as those in the first embodiment, and detailed description will be made below only as to elements and features that are different from or absent in the first embodiment.

As shown in FIG. 8, the third embodiment is characterized in that it comprises a seal cover 67 made of a filmy elastic member. The seal cover 67 is disposed between a spring bearing 35 of an extension member 29 coupled to a rear of a primary piston 8, and a flange portion of an input rod 27. The seal cover 67 seals an opening at the rear of the primary piston 8. Therefore, if brake fluid leaks from between the primary piston 8 and the input piston 26, it becomes possible to keep the leaking brake fluid inside the primary piston 8, whereby it is possible to prevent entry of corrosive brake fluid into a ball-screw mechanism 37, an electric motor 38 and a vehicle compartment, and is therefore possible to improve reliability of an electrically driven brake booster 1.

Figure 9:
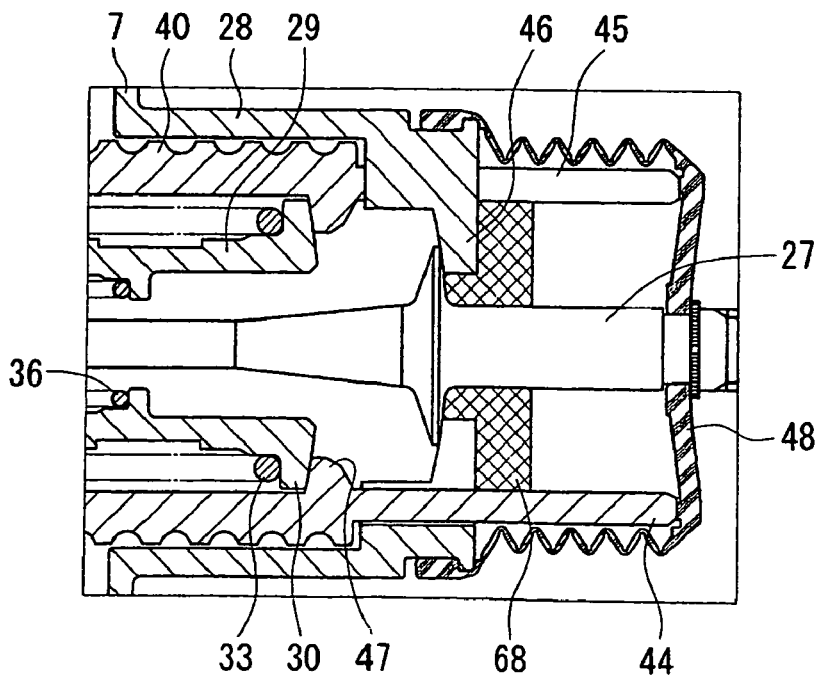
FIG. 9 is an enlarged vertical cross-sectional view illustrating main portions of a modification of the electrically driven brake booster of FIG. 8.

Referring to FIG. 9, a modification of the third embodiment will be described below. Elements corresponding to the elements in the above-discussed first embodiment will be denoted by the same reference numerals as those in the first embodiment, and detailed description will be made below only as to elements and features that are different from or absent in the first embodiment.

The modification illustrated in FIG. 9 is characterized in that it comprises an annular absorber 68 made of a polymer absorber for absorbing and retaining brake fluid. The absorber 68 is disposed at a rear of a linear motion member 40. An input rod 27 is inserted through the absorber 68. In this modification, if brake fluid leaks from between a primary piston 8 and an input piston 26, the leaking brake fluid can be absorbed by and retained in the absorber 68. As a result, it is possible to prevent entry of corrosive brake fluid into a ball-screw mechanism 37, an electric motor 38 and a vehicle compartment, and is therefore possible to improve reliability of an electrically driven brake booster 1.

In the first to third embodiments and their modifications, a fluid amount sensor (monitoring unit) (not shown) may be provided for detecting a fluid amount in the reservoir. In this case, it becomes possible to detect a malfunction of the first and second seals 56 and 57 by monitoring any decrease in fluid in the reservoir.

In the first to third embodiments, the ball-screw mechanism 37 as a rotation-linear motion converting mechanism may be replaced by another known means for converting rotation to linear motion.

Furthermore, it may be possible to combine the first embodiment, and the second embodiment or the third embodiment. Each of these combinations enables further secure prevention of corrosive brake fluid from entering the ball-screw mechanism 37, the electric motor 38 and the vehicle compartment. As a result, it becomes possible to further improve reliability of the electrically driven brake booster 1.

According to an aspect of the present invention, in an electrically driven brake booster, a brake fluid which leaks from a seal portion between a booster piston and an input piston can be discharged through a discharge passage, and can be prevented from entering portion(s) susceptible to corrosion by the brake fluid, whereby it becomes possible to improve reliability of the electrically driven brake booster.

According to an embodiment of the present invention, the seal portion comprises a first seal. Further, a second seal is provided which is spaced apart from the first seal on an opposite side of the first seal from the pressure chamber in an axial direction of the booster piston. The second seal provides a seal between the booster piston and the input piston. Furthermore, two seal units are disposed in an axially spaced-apart relationship between the booster piston and a guide portion, which guides an outer surface of the booster piston. The discharge passage is in communication with a portion between the first seal and the second seal, and extends to an outside through a space between the two seal units. In this case, a brake fluid which leaks from the first seal can be blocked off by the second seal, and can be discharged to the outside via the discharge passage and the space between the two seal units.

According to an embodiment of the present invention, the first and second seals are respectively disposed in two inner circumferential grooves formed at the booster piston. The two inner circumferential grooves, for example, may be formed by dividing an inner circumferential surface of the booster piston by a ring-shaped member. In this case, it becomes possible to easily form the two inner circumferential grooves and readily install the first and second seals.

According to an embodiment of the present invention, the electrically driven brake booster further comprises an abutting member which abuts against an end of a portion of the booster piston where the input piston is inserted through the booster piston. In this case, at least one of the first seal and second seal is disposed in the abutting member. By this arrangement, each of the first and second seals can be readily installed.

According to an embodiment of the present invention, the booster piston is axially divided to have two pieces. In this case, the discharge passage is formed along the dividing surface. By this arrangement, the discharge passage can be readily formed and the first and second seals can be readily installed.

According to an embodiment of the present invention, the rotation-linear motion converting mechanism comprises a linear motion member. The electrically driven brake booster further comprises a case portion surrounding an outer surface of the linear motion member. The booster piston is inserted in the linear motion member. The electrically driven brake booster further comprises a seal member for providing a seal between the linear motion member and the case portion. The discharge passage is disposed so that a brake fluid which leaks from the seal portion is discharged to an outside through an outer circumferential side of the seal member. In this case, the brake fluid leaking from the seal portion between the booster piston and the input piston can be prevented from entering between the linear motion member and the case portion by the seal member, and can be discharged to the outside through the discharge passage.

According to an embodiment of the present invention, a cylindrical extension portion is formed at an end of the booster piston, and the extension portion extends beyond where the booster piston and the linear motion member are coupled with each other. The discharge passage is adapted to guide a brake fluid which leaks from the seal portion to an outer circumferential side of the seal member via the extension portion. In this case, the brake fluid leaking from the seal portion between the booster piston and the input piston is discharged to an outside through the inside of the booster piston and the extension portion.

According to an embodiment of the present invention, an exit of the discharge passage is positioned in an engine room of a vehicle. Therefore, a brake fluid which leaks from the seal portion between the booster piston and the input piston is discharged into the engine room, and an inside of a vehicle compartment can be kept clean.

According to an aspect of the present invention, a brake fluid which leaks from a seal portion between a booster piston and an input piston is retained in a retaining unit, so that the brake fluid does not enter portions susceptible to corrosion by brake fluid, whereby it becomes possible to improve reliability of an electrically driven brake booster.

According to an embodiment of the present invention, the retaining unit is a resilient member covering opening of the booster piston. In this case, it is possible for the retaining unit to retain the brake fluid which leaks from the seal portion between the booster piston and the input piston According to an embodiment of the present invention, the retaining unit is an absorber capable of absorbing and retaining a brake fluid. In this case, it is possible for the absorber to absorb and retain the brake fluid which leaks from the seal portion between the booster piston and the input piston.

According to an embodiment of the present invention, a monitoring unit for monitoring a brake fluid amount is disposed at a reservoir which supplies a brake fluid to the master cylinder and receives a brake fluid from the master cylinder, and any failure of the seal portion is detected by monitoring the monitoring unit. In this case, it becomes possible to detect a failure of the seal portion with use of the monitoring unit.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-146029, filed on May 31, 2007. The entire disclosure of Japanese Patent Application No. 2007-146029 including specification, claims, drawings and summary is incorporated herein by reference in its entirety.

What is claimed is:

1. An electrically driven brake booster, comprising:
a cylindrical booster piston adapted to pressurize a pressure chamber in a master cylinder;
an input piston slidably and liquid-tightly inserted through the booster piston with a seal portion sandwiched between the input piston and the booster piston, the input piston adapted to pressurize the pressure chamber in the master cylinder in response to an operation of a brake pedal;
an electric motor; and
a rotation-linear motion converting mechanism adapted to convert a rotation of the electric motor into a linear motion to provide a thrust force to the booster piston,
wherein the thrust force provided to the booster piston is adjusted by controlling an operation of the electric motor according to an input to the input piston; and
the electrically driven brake booster further comprises a discharge passage for discharging a brake fluid which leaks from the seal portion between the booster piston and the input piston so that the leaking brake fluid is prevented from entering portion(s) susceptible to corrosion by the brake fluid.

2. The electrically driven brake booster according to claim 1, wherein:
the seal portion comprises a first seal;
the electrically driven brake booster further comprises a second seal spaced apart from the first seal on an opposite side of the first seal from the pressure chamber in an axial direction of the booster piston, the second seal providing a seal between the booster piston and the input piston;
the electrically driven brake booster further comprises two seal units disposed in an axially space-apart relationship between the booster piston and a guide portion which guides an outer circumferential portion of the booster piston; and
the discharge passage is in communication with a portion between the first seal and the second seal, and extends to an outside through a space between the two seal units.

3. The electrically driven brake booster according to claim 2, wherein:
the first seal and the second seal are respectively disposed in two inner circumferential grooves formed at the booster piston; and
the two inner circumferential grooves are formed by dividing an inner circumferential surface of the booster piston by a ring-shaped member.

4. The electrically driven brake booster according to claim 3, wherein an exit of the discharge passage is positioned in an engine room of a vehicle.

5. The electrically driven brake booster according to claim 2, further comprising an abutting member abutting an end of a portion of the booster piston where the input piston is inserted through the booster piston, the abutting member at which at least one of the first and second seal is disposed.

6. The electrically driven brake booster according to claim 5, wherein an exit of the discharge passage is positioned in an engine room of a vehicle.

7. The electrically driven brake booster according to claim 2, wherein the booster piston is axially divided, and the discharge passage is formed along a surface dividing the booster piston.

8. The electrically driven brake booster according to claim 7, wherein an exit of the discharge passage is positioned in an engine room of a vehicle.

9. The electrically driven brake booster according to claim 2, wherein an exit of the discharge passage is positioned in an engine room of a vehicle.

10. The electrically driven brake booster according to claim 2, wherein a monitoring unit for monitoring a brake fluid amount is disposed at a reservoir which supplies the brake fluid to the master cylinder and receives the brake fluid from the master cylinder, and a failure of the seal portion is detected by monitoring with use of the monitoring unit.

11. The electrically driven brake booster according to claim 1, wherein:
the rotation-linear motion converting mechanism includes a linear motion member;
a case portion surrounds an outer surface of the linear motion member;
the booster piston is inserted through the linear motion member;
the electrically driven brake booster further comprising a seal member for providing a seal between the linear motion member and the case portion; and
the discharge passage is disposed so as to discharge the brake fluid which leaks from the seal portion to an outside through an outer circumferential side of the seal member.

12. The electrically driven brake booster according to claim 11, wherein:
the booster piston includes a cylindrical extension portion at an end thereof, the extension portion extending beyond a portion where the booster piston is coupled with the linear motion member; and
the discharge passage is adapted to guide the brake fluid which leaks from the seal portion to an outer circumferential side of the seal member through the extension portion.

13. The electrically driven brake booster according to claim 12, wherein an exit of the discharge passage is positioned in an engine room of a vehicle.

14. The electrically driven brake booster according to claim 11, wherein an exit of the discharge passage is positioned in an engine room of a vehicle.

15. The electrically driven brake booster according to claim 1, wherein an exit of the discharge passage is positioned in an engine room of a vehicle.

16. The electrically driven brake booster according to claim 1, wherein a monitoring unit for monitoring a brake fluid amount is disposed at a reservoir which supplies the brake fluid to the master cylinder and receives the brake fluid from the master cylinder, and a failure of the seal portion is detected by monitoring with use of the monitoring unit.

17. An electrically driven brake booster, comprising:
a cylindrical booster piston adapted to pressurize a pressure chamber in a master cylinder;
an input piston slidably and liquid-tightly inserted through the booster piston with a seal portion sandwiched between the input piston and the booster piston, the input piston adapted to pressurize the pressure chamber in the master cylinder in response to an operation of a brake pedal;
an electric motor; and
a rotation-linear motion converting mechanism adapted to convert a rotation of the electric motor into a linear motion to provide a thrust force to the booster piston,
wherein the thrust force provided to the booster piston is adjusted by controlling an operation of the electric motor according to an input to the input piston; and
the booster piston includes a retaining unit for retaining a brake fluid which leaks from the seal portion between the booster piston and the input piston so that the leaking brake fluid is prevented from entering portion(s) susceptible to corrosion by the brake fluid.

18. The electrically driven brake booster according to claim 17, wherein the retaining unit comprises an elastic member covering an opening the booster piston.

19. The electrically driven brake booster according to claim 17, wherein the retaining unit comprises an absorber capable of absorbing and retaining the brake fluid.

20. The electrically driven brake booster according to claim 17, wherein, a monitoring unit for monitoring a brake fluid amount is disposed at a reservoir which supplies the brake fluid to the master cylinder and receives the brake fluid from the master cylinder, and a failure of the seal portion is detected by monitoring with use of the monitoring unit.

* * * * *